Oct. 15, 1946.    N. L. HAIGHT    2,409,559
DATA TRANSMITTER
Filed April 10, 1943    2 Sheets-Sheet 1

INVENTOR.
NORMAN L. HAIGHT
BY
ATTORNEY

Oct. 15, 1946.   N. L. HAIGHT   2,409,559
DATA TRANSMITTER
Filed April 10, 1943   2 Sheets-Sheet 2

INVENTOR.
NORMAN L. HAIGHT
BY
Joseph H. Lipschutz
ATTORNEY

Patented Oct. 15, 1946

2,409,559

UNITED STATES PATENT OFFICE 2,409,559

DATA TRANSMITTER

Norman L. Haight, Hoboken, N. J., assignor to Sperry Products, Inc., Hoboken, N. J., a corporation of New York Application April 10, 1943, Serial No. 482,583

2 Claims. (Cl. 177—351)

This invention relates to a method of, and means for transmitting data between two points, either through land wires or by radio. More particularly, the invention relates to the type of transmission wherein a relation of values of a plurality of impedances is transmitted, thereby obtaining a transmission system which is unaffected by such variables as will act upon the individual impedances simultaneously.

Prior devices generated a current flowing in one direction in response to one value, and another current flowing in an opposite direction in response to the other value, the magnitudes of said currents being a function of said values. This required wire connections because the system depended upon alternating the direction of current flow. Therefore, I have proposed in my prior co-pending patent application Ser. No. 452,932, filed July 30, 1942, for Data transmitter, which application was abandoned in favor of application Serial No. 518,770, filed January 18, 1944, that each value to be transmitted be caused to modulate a carrier frequency so that each value controls a block of waves. These blocks travel in succession along the transmission system either by wire or by radio, and their magnitudes are independent of the direction of current flow, and therefore no wires are needed. This enables the relative values to be received by radio. In said co-pending application, the modulated carrier was received and broken up into its modulated components which were then caused to actuate an indicator in such manner that only the peak values of these components were indicated.

The present invention carries forward the idea embodied in my co-pending patent application, but seeks to make the indications at the receiving station independent of such variables as the changing amplification factor of the tubes, fading which may cause changes in amplitude, and similar factors which may possibly affect the peak output. Therefore in the present case, I have disclosed a transmission system which has the advantages of my prior co-pending case in that I am enabled to transmit in succession values of a plurality of impedances, while at the same time rendering the received indications independent of certain variables.

For this purpose I cause the indicator at the receiving station to be operated not by the peak outputs of the modulation components, but by the actual differences between the sets of pulses corresponding to the transmitted values. These differences may be the differences in amplitudes only, or they may be the differences of the pulse areas. This difference remains the same irrespective of such variables as fading, or variations in the amplification factors of tubes, because such factors vary both sets of pulses similarly, and hence, the differential between them remains unaffected.

It is a further object of my invention to provide means at the receiving station which will be responsive not only to the difference in magnitudes of the modulation components, but also which will be phase-responsive so that it is possible to indicate in which direction the change in components has taken place. That is to say, the receiving means is responsive not only to the magnitude of the difference in pulses, but is directionally responsive, and this permits the utilization of the mechanism in connection with followup systems to operate followup devices in the proper direction to compensate for the inequality, and give an indication thereof.

Further objects and advantages of this invention will become apparent in the following detailed description thereof.

In the accompanying drawings.

Figure 1:
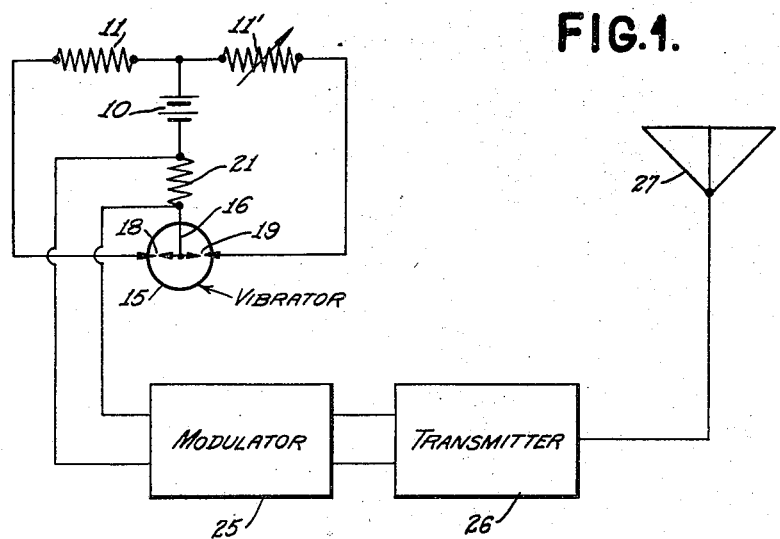
Fig. 1 is a wiring diagram of the transmitting portion of my data transmitter.
Figure 2:
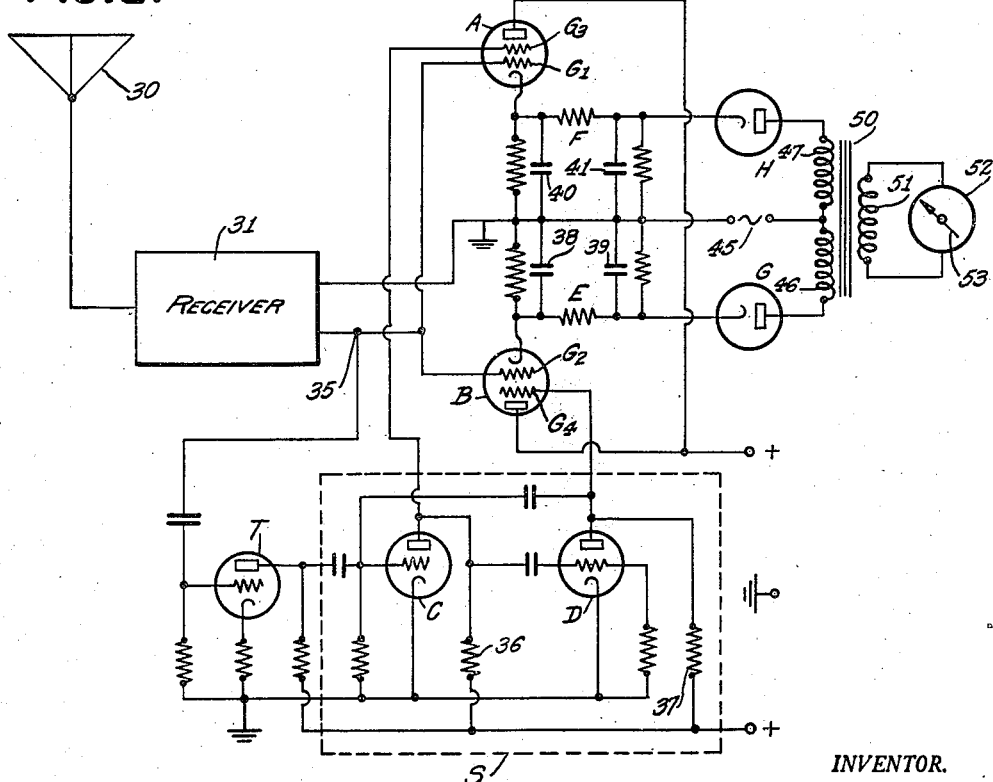
Fig. 2 is a wiring diagram showing one form of the receiving station.

Referring to Fig. 1 which represents the transmitting station I may operate from a D. C. source such as a battery 10, which supplies current to a bridge network which includes a plurality of impedances 11, 11' whose relative values are to be transmitted to a distant station and a vibrator 15, which may take a mechanical form such as the one shown, having a double armature 16 designed to make contact at 18 and 19; or if desired, it may be replaced by a thermionic device. It will be seen that as the vibrator vibrates, a circuit will be closed from battery 10, first through impedance 11, and then through impedance 11'. It will be apparent that as the circuits are closed and opened at contacts 18 and 19, alternate pulses will be generated, whose value depends upon the magnitude of the impedances 11 and 11'. The impedance 11 may be some standard impedance with which a variable impedance 11' is to be compared; or in certain other cases, both impedances 11 and 11' may be variable.

As pointed out in my co-pending application

Ser. No. 452,932, which was abandoned in favor of application Serial No. 518,770, filed January 18, 1944, it was the practice prior to my type of data transmitter to cause the current pulses generated when contacts 18 and 19 were closed and opened, to be transmitted as positive and negative currents through a meter, where they were averaged. Thus, if the two current pulses were of equal magnitude, the meter read zero, whereas if one or the other of impedances 11 and 11' predominated, the meter would give an indication in one direction or the other. This system however limited the device to a wire transmission system, because wires are necessary when direction of current is an essential element. In the present invention, however, as in my co-pending case, the transmission is independent of direction of current pulses, and therefore transmission may be effected by radio as well as by wire.

For this purpose the current pulses generated in the circuits including the impedances 11 and 11' are caused to apply voltages across an impedance 21, and these voltages are caused to modulate a carrier frequency generated by modulator 25, and then transmitted by transmitter 26 and antenna 27.

The modulated carrier may be received by an antenna 30 and led to a suitable receiver 31. The received signals come out of the receiver 31 substantially rectified so that they are substantially uni-directional pulses which will all be of the same amplitude if the relative values of impedances 11 and 11' are equal, but will be of different amplitudes if the relative values are unequal. In the latter case, large and small pulses will follow alternately and successively. The idea of the receiving system is to evaluate separately the pulses corresponding to the impedance 11 and the pulses corresponding to the impedance 11', and to obtain the differences between them. For this purpose, the output of the receiver 31 is applied simultaneously to the grids $G_1$ and $G_2$ of two tubes A and B, and one of these tubes is made conductive when the pulses corresponding to the value of impedance 11 come through and the other tube is made conductive when the pulses corresponding to impedance 11' come through. That is to say, tube A may be made responsive to pulses 1, 3, 5, etc., generated as a function of impedance 11, while tube B is made responsive to pulses 2, 4, 6, etc., corresponding to the pulses generated by impedance 11'; or if desired, the tubes may be made responsive to some other series of these pulses; that is to say, tube A may respond to pulses 1, 5, 9, etc., while tube B is responsive to pulses 4, 8, 12, etc.

To make tubes A and B alternately conductive in synchronism with the respective odd and even pulses, there may be provided a switch in the form of an oscillatory system indicated generally at S, such as described in the publication of Reich, called "Theory and Applications of Electron Tubes," page 360, published by McGraw-Hill Book Company, New York, New York. Such a system may consist of two tubes C and D, the tube C being designed to be tripped by a tube T whose input grid is controlled by the output from the receiver 31 taken off at point 35. When the output from trip tube T reaches a predetermined magnitude, tube C will be tripped to make the same conductive. This will cause a large drop in voltage across resistor 36, and hence, reduce the positive voltage which the plate of tube C applies to auxiliary grid $G_3$ of tube A. This will render tube A non-conductive. When tube C is conductive, tube B is non-conductive; which means that there is a low voltage drop across resistor 37, and hence, a large positive potential is applied to auxiliary grid $G_4$ of tube B to make said tube conductive. Thus, the modulation component or pulse which is issued from receiver 31 at this time will be applied to grid $G_2$, and current will flow through tube B and through circuit E to charge condensers 38 and 39. Because of the feedback between tubes C and D, tube D will gradually become conductive, and tube C non-conductive, and the frequency of the oscillatory system S is such that tube D will become conductive when the next modulation component or pulse issues from receiver 31. Tube D becoming conductive will render tube B non-conductive and tube A conductive. Thus, the second pulse issuing from the receiver being applied to grid $G_1$, and the tube being rendered conductive, current will flow through said tube and through a circuit F similar to circuit E, and containing condensers 40 and 41. The two circuits E and F are arranged in opposition. By the time the second pulse has caused current to pass through tube A the feedback between tubes D and C has again started to render the tube C conductive and tube D non-conductive. At this instant, the third impulse from the receiver is applied by trip tube T to the grid of tube C, and thus, start another cycle for the next two pulses. It will thus be seen that the frequency of complete cycles of oscillator S must be equal to one-half of the pulse rate of the pulses issuing from receiver 31. The pulse applied by trip tube T to tube C when the second pulse issues from receiver 31 is ineffective because the plate voltage of tube C at this time is insufficient. By the time the third pulse issues from receiver 31, the pulse from trip tube T is effective to synchronize tube C because the feedback from tube D to tube C has built up the plate voltage of tube C to the proper magnitude to render the tube conducting.

The circuits E and F are caused to modulate a balanced modulator having two branches H and G. These branches are supplied with power from any suitable A. C. source 45, and the power is then supplied to the mid-point of split primary coils 46 and 47 of transformer 50, the current flowing in opposite phase through the two windings 46 and 47. If the charges on the condensers in circuits E and F are equal, that is to say, if the pulses passed by tubes A and B alternately have been equal, then the circuits H and G will be equally affected, and will cancel out. If however, one set of alternate pulses is greater or less than the other set of alternate pulses, then the pulses passing through tube A will be greater or less than the pulses passing through tube B, and the charge on the condensers in circuit F will be greater or less than the charge on the condensers in circuit E, and the currents flowing in the two branches H and G will be unequal. The degree of inequality of the current flow in circuits H and G is a measure of the difference of impedance values between impedances 11 and 11'. If the current flow in H is greater than in G, then the output in transformer 50 will be of one phase, while if the current flowing in G is greater than in H, the output of transformer 50 will be of an opposite phase. The magnitude of the difference in currents flowing in circuits H and G in each case will be a measure of the difference between the two impedances, while the phase of the output of transformer 50 will indicate which impedence 11 or 11' is greater. Thus, the output in the secondary coil 51 of transformer 50 will give an indication of both the degree and direction of difference between the two impedances. A phase and amplitude responsive meter 52 will indicate by the position of needle 53 the magnitude of the difference in values between impedances 11 and 11', while the direction of movement of the needle will give an indication as to which impedance is greater.

Figure 3:
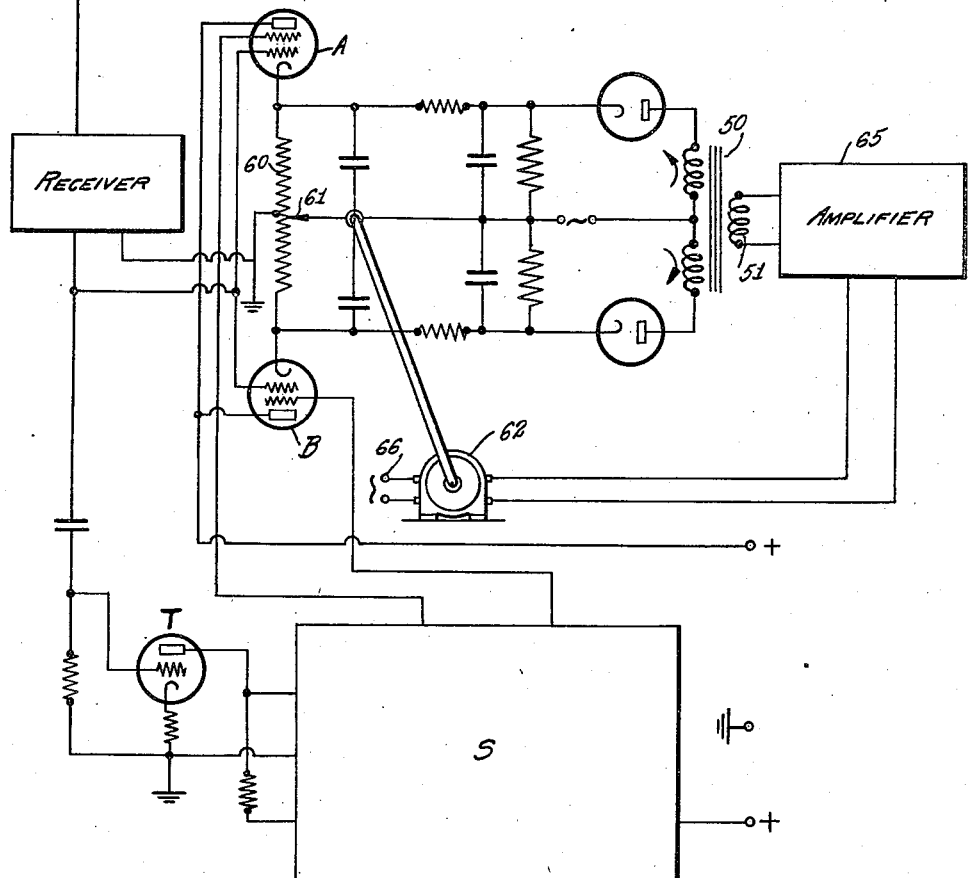
Fig. 3 is a wiring diagram of another form of my invention, wherein a followup system may be utilized.

In Fig. 3 I have shown a form of the invention wherein the output in the secondary 51 of the transformer 50 may be utilized to operate a direction-responsive followup by reason of the fact that this output is a function of both magnitude and direction of differences between the impedances 11 and 11'. Thus, there may be applied across resistor 60, which joins the filaments of the tubes A and B, a potentiometer contact 61 whose movement is designed to be controlled by a motor 62, which, in turn, is controlled by the output of secondary 51 after being amplified by any suitable amplifier such as 65. The motor may be of the two phase type energized from any suitable source of current, such as the A. C. source 66 shown, and may be controlled by the output of coil 51. The magnitude and phase of the output of coil 51 will determine the extent of movement of the armature and the direction of such movement, and the motor may be geared to the contact 61 so that it will move in such direction as to restore the balance in the circuits E and F and H and G.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I desire and claim to secure by Letters Patent is:

1. A system for transmitting the relative values of a pair of impedances, comprising means for generating a carrier, means whereby said impedances alternately modulate the carrier corresponding to the values of said impedances, means for transforming the carrier into the modulation components, a pair of opposed condenser circuits, means whereby the modulation components corresponding to said impedances charge the respective condenser circuits to generate a differential current, whereby the magnitude of the differential current will depend upon the differences in magnitude between the respective impedances and the direction of the differential current will depend upon the predominance of one or the other of said impedances, and means responsive to the magnitude and direction of said differential current.

2. A system for transmitting the relative values of a pair of impedances, comprising means for generating a carrier, means whereby said impedances alternately modulate the carrier corresponding to the values of said impedances, means for transforming the carrier into the modulation components, a pair of opposed condenser circuits, means whereby the modulation components corresponding to said impedances charge the respective condenser circuits to generate a differential current, whereby the magnitude of the differential current will depend upon the differences in magnitude between the respective impedances and the direction of the differential current will depend upon the predominance of one or the other of said impedances, said opposed circuits including a pair of primary transformer coils, one coil in each of said circuits, and a secondary coil responsive to the magnitude and direction of the differential current generated in said primary coil.

NORMAN L. HAIGHT.